Dec. 21, 1965
R. C. TALBOT ETAL
3,224,551
CONVERGER AND STACKER FOR COOKIES
Filed Dec. 12, 1963
2 Sheets-Sheet 1
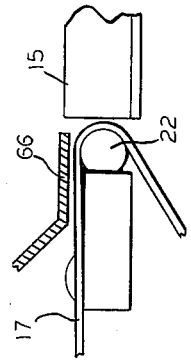
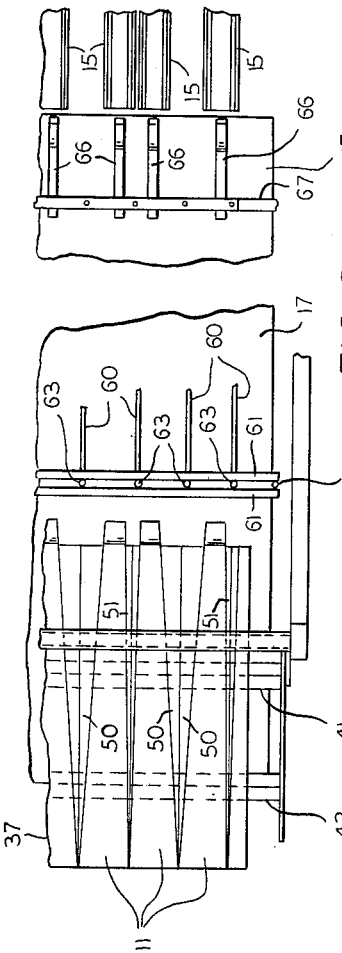
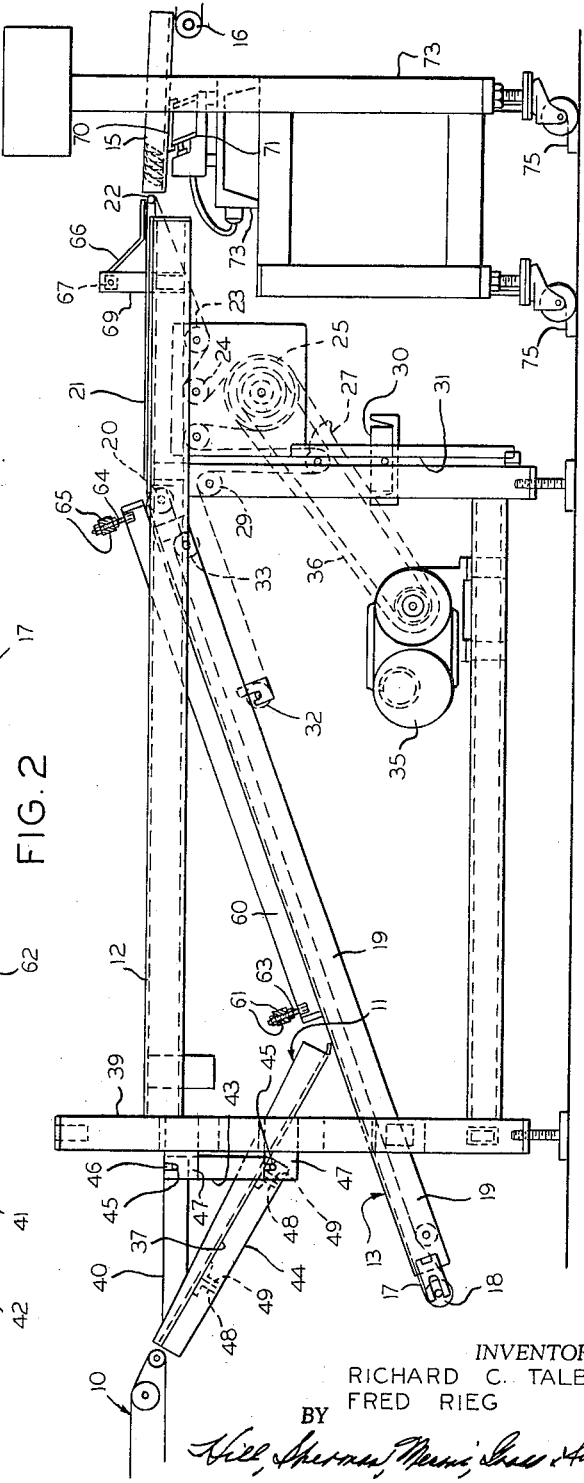
INVENTORS
RICHARD C. TALBOT
FRED RIEG
BY
ATTORNEYS

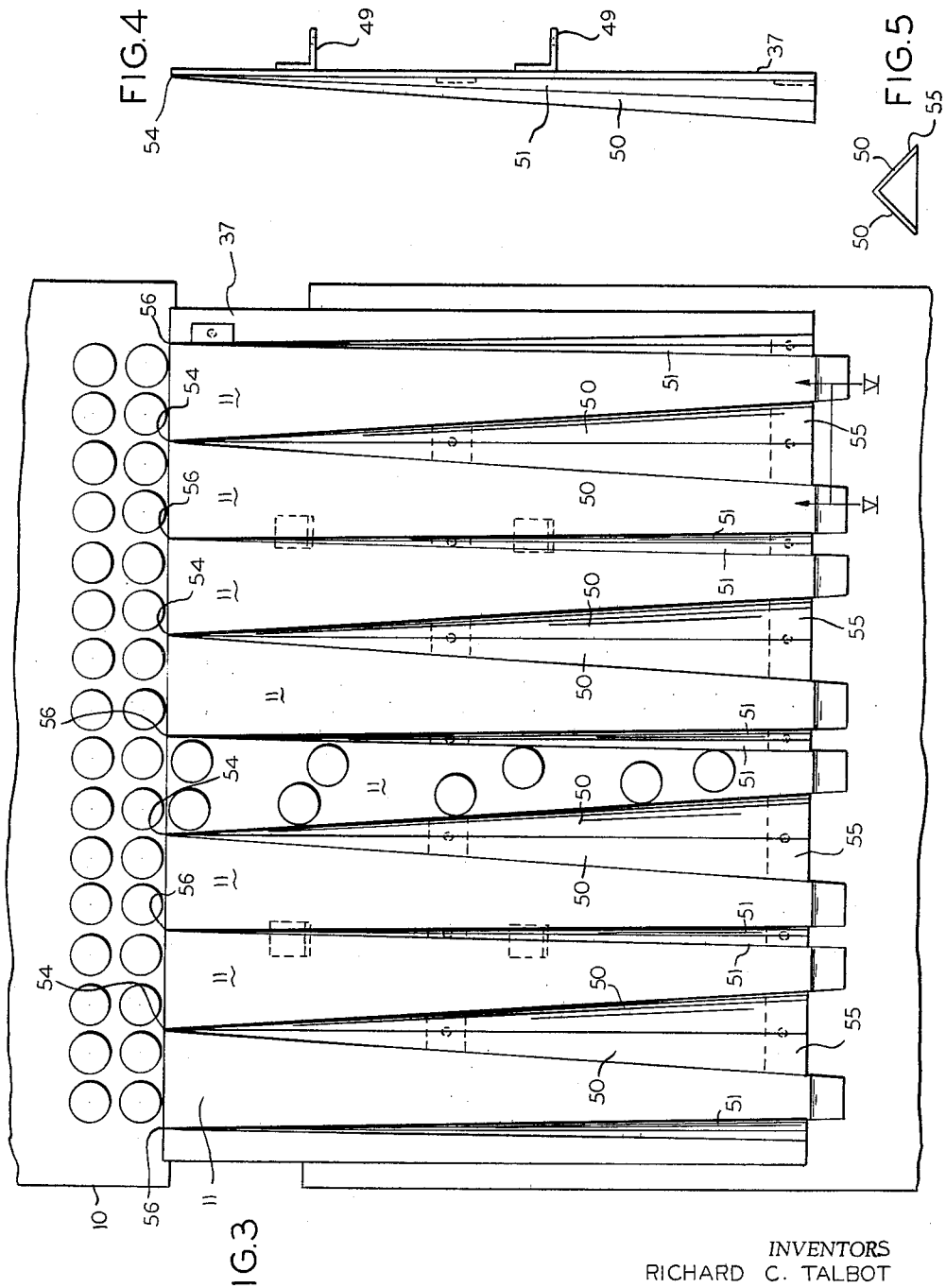

United States Patent Office 3,224,551
Patented Dec. 21, 1965

3,224,551
CONVERGER AND STACKER FOR COOKIES
Richard C. Talbot, Skokie, and Fred Rieg, Chicago, Ill., assignors to Peters Machinery Company, Chicago, Ill., a corporation of Illinois
Filed Dec. 12, 1963, Ser. No. 330,049
8 Claims. (Cl. 198—32)

This invention relates to improvements in devices for arranging cookies as they come out of a baking oven into rows and stacking the rows of cookies for sandwiching or packaging.

A principal object of the invention is to provide a simple and improved form of mechanism for arranging cookies coming out of a baking oven in rows for ready packaging or sandwiching.

Another object of the invention is to provide a simplified chute arrangement for arranging multiple rows of cookies delivered from a baking oven into single rows.

Still another object of the invention is to provide an improved form of means for arranging cookies in rows in the form of a chute having converging guides extending therealong from the receiving to the discharge end thereof, so arranged that the opposite side walls of the guides afford varying resistance to cookies passing therealong, to accommodate the delivery of multiple rows of cookies to the guides and the discharge of cookies from the guides in single rows.

Still another object of the invention is to provide a simple and improved form of converging chute for receiving cookies delivered in multiple rows and arranging the cookies in single rows in which the chute provides a plurality of converging guides having oppositely inclined sides of varying heights, so arranged that the sides of greater height will retard the cookies delivered thereto and accommodate the cookies engaging the sides of lesser height to pass in advance of the retarded cookies to deliver the cookies from the chute in rows, without clogging during delivery thereof.

A still further object of the invention is to provide a simplified form of slide for converging rows of cookies discharged to the slide, into single rows, with a combined belt and shaker conveyor arrangement for taking the rows of cookies and stacking the cookies for further use.

These and other objects of the invention will appear from time to time as the following specification proceeds and with reference to the accompanying drawings wherein:

FIGURE 1 is a view in side elevation of a conveyor and stacker constructed in accordance with the principles of the present invention;

FIGURE 2 is a fragmentary plan view of the converger shown in FIGURE 1;

FIGURE 3 is an enlarged plan view of the converging chutes;

FIGURE 4 is a view in side elevation of the chutes shown in FIGURE 3;

FIGURE 5 is a fragmentary sectional view taken substantially along lines V—V of FIGURE 3; and FIGURE 6 is a detail view showing the discharge end of the elevating conveyor, elevating the cookies for stacking.

In the embodiment of the invention illustrated in the drawings, we have diagrammatically shown in FIGURE 1 a converger and stacker for cookies, cakes and the like, including a feed conveyor 10 receiving cookies deposited thereon from a baking oven conveyor or any other conveyor, and feeding the cookies to converging chutes or slides 11, mounted at the receiving end of a frame structure 12, and inclined downwardly into discharge relation with respect to an elevating conveyor 13. The elevating conveyor 13 elevates and conveys the rows of cookies to a stacker 15, upending the cookies by the vibratory motion of the stacker, and discharging the cookies in stacked relation with respect to each other onto a conveyor 16, taking the cookies for packaging or further treatment.

The feed conveyor 10 may be in the form of a flat endless canvas belt conveyor of a well known construction and is no part of the present invention so not herein shown or described further.

The elevating conveyor 13 may also be a flat canvas belt conveyor including a canvas belt 17 trained about a direction changing idler 18 at the lower end of an inclined frame 19, extending upwardly from beneath the converging chute 11 to a position adjacent the top of the frame structure 12, and suitably mounted therebetween. The belt 17 turns about an idler 20 at the upper end of the inclined frame structure 19 and extends along a horizontally extending frame structure 21 and turns about a nose piece 22 at the discharge end of the horizontal frame structure 21. The nose piece 22 terminates at the receiving end of the vibrating stacker trough 16 for discharging cookies thereon to be stacked for packaging or further treatment. From the nose piece 22, the belt 17 extends downwardly around and over a series of idlers 23 and 24 and about a drive roller 25. From thence the belt extends upwardly over an idler 26 and under a tension idler 27, engaging the bight of said belt between the idler 26 and a forwardly spaced idler 29. The tension idler 27 may be biased downwardly to maintain the belt under the required tension by weight means 30 guided in vertical guides 31. From the idler 29 the belt passes about a take-up idler 32 and upwardly around an idler 33, and downwardly therefrom along the inclined frame structure 19 to and about the idler 18. The drive roll is driven from a motor 35 of the speed reducer type, in which the output speed of the motor may be varied to provide a desired speed of travel of the belt 17. The drive from the speed reducer motor 35 to the drive pulley 25 may be a chain and sprocket drive 36.

The converging chutes 11 are shown in FIGURE 3 as being a part of and as extending along the top surface of a flat slide plate 37, mounted between parallel spaced standards 39, 39 of the frame structure 12, and supported at the receiving end thereof between support arms 40, 40 extending rearwardly of the standards 39, 39.

The arms 40 form horizontal struts of a generally triangular support structure at opposite sides of the chutes 11. A vertical strut 43 extends downwardly of each arm 40 adjacent the rear end thereof and has an inclined strut 44 extending angularly upwardly therefrom and welded or otherwise secured to an arm 40, adjacent the receiving end of the chute 11. Pins 45 extend outwardly of the vertical leg or strut 43, adjacent the upper and lower ends thereof and register with upwardly opening slots 46 in vertically spaced support plates 47, secured to the struts 39 and extending rearwardly therefrom. The inclined struts 44 are inclined at the angle of the slide plate 37 and are connected together by angle irons 48, abutted by angle irons 49 extending across the bottom of the slide plate 37, and welded or otherwise secured thereto. A suitable fastening means, such as nuts and bolts (not shown), may be provided to secure the angle irons 48 and 49 in abutting engagement with each other and to thereby secure the slide plate 37 and chutes 11 to the triangular frame structure 41.

The chutes 11 are shown as comprising a plurality of alternate high and low converging inclined side walls 50 and 51 extending along the top surface of the slide plate 37. The inclined side walls 50 are formed by semi-pyramidal plate structures having apices 54 at the entering end of the slide plate 37 and bases 55 at the discharge end of the plate 37. The inclined side walls 50, 50 form the inclined side walls of adjacent chute structures and meet at a peak or apex extending for the length of the pyramidal structure.

The side walls 51, 51 are also made from generally pyramidal structures secured to the top face of the slide plate 37 and extending therealong and forming inclined side walls 51 extending in opposite directions from an apex 56 of each structure. The apices of convergence of the side walls 50 of the semi-pyramidal structures extend in parallel relation with respect to each other with the result that the high side walls 50 offer a longer path of travel along the plate 37 than the low side walls 51, and place a drag on the cookies sliding downwardly along the chutes 11, with the result that the cookies moving along the longer side walls will be retarded to fall into place behind the cookies moving along the shorter side walls.

In this manner, the cookies as delivered to the chutes 11 will slide downwardly therealong and fall into line with each other, and be discharged through the constricted or converging discharge ends of the associated chutes, one by one.

The inclined portion of the conveyor 13 has a plurality of metallic guide members 60, in the form of thin metal strips, extending therealong and forming guides, along which the aligned cookies travel upwardly along said conveyor. As generally shown in FIGURES 1 and 2, two adjacent parallel spaced bars 61 are spaced above the belt 17 and extend thereacross adjacent the chutes 11 and are mounted in vertically spaced relation with respect to the frame structure 19 on support members 62. The bars 61 have threaded members 63 extending in the space therebetween, and suitably secured thereto and depending therefrom and forming connectors for the lower ends of the guide strips 60. The opposite upper end portions of the guide strips 60 are suitably attached to rods 64, mounted at their upper ends between bars 65 extending across the belt and suitably mounted on the conveyor frame structure 19 in vertically spaced relation with respect thereto.

Retarding fingers 66 are provided for each row of cookies at the discharge end portion thereof and are spaced above the horizontal run of the belt 17, a distance sufficient to place a lag on the cookies as they pass therebeneath, and to hold the cookies to the belt so that they do not drop down at the discharge end thereof and are discharged onto the vibratory trough 15 in a relatively flat condition, to be upended by the vibratory motion of said troughs with one face trailing, as shown in FIGURE 1. The retarding fingers 66 are mounted on a bar 67 extending across the horizontal portion 21 of the conveyor, adjacent the discharge end thereof, and mounted on upright support structures 69, extending upwardly of the conveyor frame structure. The retarding fingers 66 are made from spring steel and extend angularly downwardly of the bar 67 toward the discharge end of the conveyor and have flat finger portions spaced above the belt 17 a distance sufficient to place a lag on the cookies and prevent the cookies from being projected a substantial distance along the vibratory trough 15.

A vibratory trough 15 is provided for each row of cookies. Said troughs extend parallel to the horizontal run of the conveyor 13 and have oppositely inclined side walls converging to a generally rounded bottom, conforming generally to the shapes of the cookies. Each trough 15 is supported on a vibratory driver 70 extending angularly upwardly and rearwardly of a base 71 for the vibratory drive mechanism. The vibratory mechanism may be an electrically operated high frequency vibratory mechanism of a conventional form, and is no part of the present invention so need not herein be shown or described further. The base 71 is mounted on a stand 73, mounted on the top surface of a stand 73. The stand 73 is herein shown as being wheeled to accommodate ready movement thereof, but has shoes 75 engageable with the floor during operation of the vibratory conveyors 15 to prevent wandering of the stand along the floor.

It may be seen from the foregoing that a simple and improved means has been provided for taking cookies or cakes from a baking oven, discharged onto a conveyor in multiple rows, aligning the cakes in single rows and stacking the cakes for packaging or further treatment, and that the alignment of the cakes in rows is attained by individual inclined chutes for each row, the side walls of which are longer and higher at one side thereof than the other, to place a frictional drag on the cookies discharged onto the high side walls, and accommodating the cookies moving along the low side walls to travel at higher rates of speed, with the result that the retarded cookies will drop behind the faster traveling cookies and the cookies will be discharged for further processing in longitudinal alignment with each other, and that the particular side wall construction of the chutes makes possible this aligned discharge of the cookies and accommodates free travel of the cakes or cookies along the inclined chutes.

While we have herein shown and described one form in which the invention may be embodied, it may be readily understood that various modification and variations in the invention may be attained without departing from the spirit and scope of the novel concepts thereof.

We claim as our invention:

1. In a converger for cookies and the like, converging multiple rows of cookies into single rows, an inclined slide having at least one chute extending therealong, said chute having spaced side walls inclined outwardly of said slide and spaced apart at their receiving ends to receive at least two cookies in side by side relation and converging to discharge ends having a spacing to accommodate the discharge of one cookies therefrom, said side walls converging toward the discharge ends thereof at different angles and one of said side walls being longer than the other, the longer side wall placing a drag on the cookies delivered thereon and retarding travel of cookies along said chute to accommodate cookies delivered to the shorter side wall to move in advance of the cookies delivered to the longer side wall, with the resultant alignment of the cookies passing through the discharge end of said chute one behind the other.

2. A converger for cookies and the like, taking multiple rows of cookies and converging the cookies into single rows, comprising an inclined slide having an elevated receiving end, at least one converging chute extending along said slide, said chute having a receiving end of a width sufficient to receive at least two cookies in side by side relation with respect to each other and having opposite inclined side walls converging to a spacing of a width slightly greater than the width of a single cookie at the discharge end of said chute, one of said inclined side walls being higher than the other and converging toward the center of the chute at a steeper angle than the other, the higher side wall placing a drag on cookies falling thereon and accommodating cookies falling on the lower side wall to pass ahead of those falling on the higher side wall, to thereby effect the aligning of the cookies into a row at the discharge end of said chute.

3. A converger, converging multiple rows of cookies into single rows, comprising an inclined slide, a plurality of converging chutes extending along said slide in side by side relation with respect to each other, each chute having opposite inclined side walls of different lengths, the side walls of adjacent chutes being generally semi-pyramidal in plan with the apices of the pyramids thereof at the receiving ends of said chutes spaced apart distances greater than the width of two cookies in side by side relation with respect to each other and the bases of the pyramids at the discharge ends of said chutes spaced apart distances slightly greater than the width of a cookie, alternate bases of said pyramids being wider than the others providing a longer and higher side wall extending along one side of said chute than the other, whereby the longer and higher side wall provides a greater resistance to the movement of cookies discharged thereon to move along said chute than the shorter side wall and thereby retards the progress of cookies moving therealong and accommodates the cookies moving along the shorter side wall to move in advance of those moving along the longer side wall and arrange themselves in rows.

4. In a converger for cookies and the like and in combination with a feed conveyor and an upwardly inclined elevating conveyor spaced therebeneath, means between said conveyors taking cookies discharged from said feed conveyor in multiple rows and arranging the cookies in single rows for discharge onto said inclined elevating conveyor, comprising an inclined slide in cookie receiving relation with respect to said feed conveyor and in cookie discharge relation with respect to said inclined elevating conveyor, said slide having a plurality of converging chutes extending therealong in side by side relation with respect to each other and in cookie receiving relation with respect to said feed conveyor, said chutes being at least as wide as the width of two cookies in side by side relation at their receiving ends and converging to widths slightly greater than the width of a single cookie at their discharge ends and having opposite side walls inclined outwardly with respect to said slide at different angles with respect to each other and converging toward each other at different angles with respect to each other whereby one side wall is longer than the other and the longer side wall places a drag on cookies falling thereon and accommodates the cookies falling on the shorter side wall to move in advance of cookies falling on the longer side wall.

5. In a converger for cookies and the like and in combination with a feed conveyor, an inclined slide having at least one converging chute extending therealong in cookie receiving relation with respect to said conveyor and having opposite inclined side walls of different heights and lengths, converging toward the center of said chute at different angles with respect to each other, to effect the moving of cookies along said chute, one behind the other, an upwardly inclined conveyor at the discharge end of said chute having an upper generally horizontal run, and vibratory stacker means at the discharge end of said conveyor, effecting the progress of the cookies for further processing and the stacking thereof by the vibratory action of said stacker means.

6. In a converger for cookies and the like and in combination with a feed conveyor and an upwardly inclined elevating conveyor spaced downwardly therebeneath, and means between said conveyors taking multiple rows of cookies discharged from said conveyor and arranging the cookies in single rows, and discharging the cookies in rows onto said inclined conveyor comprising an inclined slide in cookie receiving relation with respect to said feed conveyor and in cookie discharge relation with respect to said inclined conveyor, said slide having a plurality of converging chutes extending therealong in side by side relation with respect to each other for receiving multiple rows of cookies, said chutes being wider at their receiving ends than their discharge ends and having inclined side walls converging toward each other at different angles with respect to each other to place a drag on cookies falling on one side wall and accommodate the cookies falling on the opposite side wall to move in advance thereof, said inclined elevating conveyor having a horizontal run at the upper end thereof, at least one vibratory stacker in cookie receiving relation with respect to said horizontal run and including a vibratory feeder trough, and a retarding finger at the discharge end of said horizontal run having a finger portion spaced above said horizontal run and extending into juxtaposition with said vibratory feeder trough and retarding the flow of cookies onto said trough and effecting the discharge thereof one side up for stacking by said trough, the side facing upwardly trailing.

7. In a converger for cookies and the like and in combination with a feed conveyor and an upwardly inclined elevating conveyor spaced downwardly therebeneath, and means between said conveyors taking multiple rows of cookies discharged from said feed conveyor and arranging the cookies in single rows, and discharging the cookies in rows onto said inclined conveyor comprising an inclined slide in cookie receiving relation with respect to said feed conveyor and in cookie discharge relation with respect to said inclined conveyor, said slide having a plurality of converging chutes extending therealong in side by side relation with respect to each other for receiving multiple rows of cookies, said chutes being wider at their receiving ends than their discharge ends and having inclined side walls converging toward each other at different angles with respect to each other to place a drag on the cookies falling on one side wall and accommodate the cookies falling on the opposite side wall to move in advance thereof, said inclined elevating conveyor having a horizontal run at the upper end thereof, at least one vibratory stacker in cookie receiving relation with respect to said horizontal run and including a vibratory feeder trough, a relatively small diameter nose piece at the discharge end of said conveyor and about which said conveyor turns and extending closely adjacent said vibratory trough and positioning the discharge end of said conveyor to effect the discharge of cookies onto said vibratory trough in a generally flat condition.

8. In a converger for cookies and the like and in combination with a feed conveyor and an upwardly inclined elevating conveyor spaced downwardly therebeneath, and means between said conveyors taking multiple rows of cookies discharged from said feed conveyor and arranging the cookies in single rows, and discharging the cookies in rows onto said inclined conveyor comprising an inclined slide in cookie receiving relation with respect to said feed conveyor and in cookie discharge relation with respect to said inclined conveyor, said slide having a plurality of converging chutes extending therealong in side by side relation with respect to each other for receiving multiple rows of cookies, said chutes being wider at their receiving ends than their discharge ends and having inclined side walls converging toward each other at different angles with respect to each other to place a drag on cookies falling on one side wall and accommodate the cookies falling on the opposite side wall to move in advance thereof, said inclined elevating conveyor having a horizontal run at the upper end thereof, at least one vibratory stacker in cookie receiving relation with respect to said horizontal run and including a vibratory feeder trough, a relatively small diameter nose piece at the discharge end of said conveyor and about which said conveyor turns and extending closely adjacent said vibratory trough and positioning the discharge end of said conveyor to discharge in a plane beneath the top of said vibratory trough, and a resilient spring finger spaced above said nose piece and extending therealong to the discharge end of said conveyor and engageable with the tops of the cookies passing along said conveyor and cooperating with said nose piece to retard movement thereof onto said vibratory trough and to effect the discharge of cookies onto said vibratory trough in a generally flat condition.

References Cited by the Examiner

UNITED STATES PATENTS

| 899,760 | 9/1908 | Remington | 214—1 |
| 3,084,783 | 4/1963 | Morton et al. | 198—32 X |

FOREIGN PATENTS

| 1,004,103 | 3/1957 | Germany. |
| 100,571 | 2/1962 | Netherlands. |

SAMUEL F. COLEMAN, *Primary Examiner.*

WILLIAM B. LA BORDE, *Examiner.*